United States Patent
Jahnke (10) Patent No.: US 8,863,072 B1
(45) Date of Patent: Oct. 14, 2014

(54) FPGA AND OS IMAGE BUILD TOOL

(71) Applicant: Altera Corporation, San Jose, CA (US)

(72) Inventor: Steve Jahnke, Allen, TX (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/922,114

(22) Filed: Jun. 19, 2013

(51) Int. Cl.
*G06F 17/50* (2006.01)

(52) U.S. Cl.
CPC .................. *G06F 17/5054* (2013.01)
USPC ............ 716/138; 716/116; 716/117; 716/132

(58) Field of Classification Search
USPC .................................. 716/116–117, 132, 138
See application file for complete search history.

(56) References Cited

U.S. PATENT DOCUMENTS

| | | | | |
|---|---|---|---|---|
| 4,194,113 | A * | 3/1980 | Fulks et al. .................... | 714/732 |
| 5,604,888 | A * | 2/1997 | Kiani-Shabestari et al. ... | 703/23 |
| 6,941,538 | B2 * | 9/2005 | Hwang et al. .................. | 716/102 |
| 7,007,264 | B1 * | 2/2006 | Baxter .......................... | 716/103 |
| 7,272,546 | B1 * | 9/2007 | Brown et al. .................... | 703/13 |
| 7,331,022 | B1 * | 2/2008 | Pritchard et al. ............... | 716/126 |
| 8,018,249 | B2 * | 9/2011 | Koch et al. ....................... | 326/41 |
| 8,635,571 | B1 * | 1/2014 | Goldman ....................... | 716/117 |
| 2011/0254687 | A1 * | 10/2011 | Arponen et al. ............... | 340/540 |
| 2013/0315211 | A1 * | 11/2013 | Balan et al. .................... | 370/336 |

OTHER PUBLICATIONS

Hamblen et al.; "Rapid Prototyping of Digital Systems"; Springer; 2006; pp. 1-371.*

* cited by examiner

*Primary Examiner* — Naum B Levin
(74) *Attorney, Agent, or Firm* — Weaver Austin Villeneuve & Sampson LLP (57) ABSTRACT

Various embodiments of the present disclosure provide techniques for producing configuration images of a system on a chip (SOC) design, including a programmable logic device (PLD) and operating system (OS) packages, responsive to a user selection of one or more modules of the PLD and a user selection of at least one OS package. A processor configured to run a design tool, builds the configuration image of the SOC. The design tool compiles a PLD configuration image corresponding to the first selection, selects one or more PLD module drivers corresponding to the first selection, compiles a bootloader and OS kernel design corresponding to the selected one or more module drivers and the PLD image; and builds the configuration image of the SOC corresponding to the bootloader and OS kernel design and the second selection.

18 Claims, 5 Drawing Sheets

FPGA AND OS IMAGE BUILD TOOL

TECHNICAL FIELD

The present disclosure generally relates to integrated circuits and, more particularly, to techniques for building a configuration image of an integrated circuit that includes a programmable logic device (PLD) and an operating system (OS) package.

BACKGROUND

A programmable logic device (PLD) is a semiconductor integrated circuit that contains logic circuitry that can be programmed to perform a host of logic functions.

An example of a PLD that may benefit from the presently disclosed design tools and techniques include a field programmable gate array (FPGA) and, particularly an FPGA configured, within an integrated system on a chip (SOC), together with associated operating system (OS) packages.

Computer-aided design tools to design a custom logic circuit to be implemented on a PLD use information regarding the hardware capabilities of a given PLD to help the designer implement the custom logic circuit using resources available on the PLD. However, existing tools have limited abilities to assist the design of an integrated SOC that may include complex embedded processors, multiple diverse FPGA modules and FPGA module drivers as well as multiple diverse OS drivers.

Improved techniques for efficiently designing such SOC's, including producing a configuration image of the designed SOC, are therefore desirable.

SUMMARY OF INVENTION

The presently disclosed techniques produce configuration images of an SOC design, including PLD and OS packages, responsive to a user selection of one or more modules of the PLD and a user selection of at least one OS package.

In some implementations, a processor configured to run a design tool, builds the configuration image of the SOC. The processor accepts as user inputs (i) a first selection of at least one module of a PLD for implementation in the SOC; and (ii) a second selection of at least one OS package for implementation in the SOC. The design tool compiles a PLD configuration image corresponding to the first selection, selects one or more PLD module drivers corresponding to the first selection, compiles a bootloader and OS kernel design corresponding to the selected one or more module drivers and the PLD image; and builds the configuration image of the SOC corresponding to the bootloader and OS kernel design and the second selection.

These and other features will be presented in more detail in the following specification of the invention and the accompanying figures, which illustrate by way of example the principles of the invention.

BRIEF DESCRIPTION OF THE DRAWINGS

The included drawings are for illustrative purposes and serve only to provide examples of possible implementations of the disclosed inventive techniques. These drawings in no way limit any changes in form and detail that may be made by one skilled in the art without departing from the spirit and scope of the disclosed implementations.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Reference will now be made in detail to embodiments of the present invention. Examples of these embodiments are illustrated in the accompanying drawings. While the invention is described in conjunction with these embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular types of devices. However, it should be noted that the techniques and mechanisms of the present invention apply to a variety of different types of devices. In the following description, numerous specific details are set forth in order to provide a thorough understanding of the present invention. Particular exemplary embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that various embodiments may include multiple iterations of a technique or multiple instantiations of a mechanism unless noted otherwise. For example, a system may use a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to a memory component, but it will be appreciated that a variety of bridges and controllers may reside between the processor and memory. Consequently, a connection does not necessarily mean a direct, unimpeded connection unless otherwise noted.

As used herein, and in claims, the term "PLD" means a programmable logic device such as, for example, an FPGA or any other programmable hardware on a chip where a portion of the chip is configured to be retargetable to perform a new hardware function that requires a driver to be tied to it.

The presently disclosed techniques produce configuration images of SOC designs, including PLD and OS packages, responsive to a user selection of one or more modules of the PLD and a user selection of at least one OS package. In some implementations, a design tool for a programmable chip builds a configuration image of an SOC based on user inputs selecting at least one module of the PLD and at least one OS package for implementation in the SOC. The design tool, responsive to user selection of a PLD module, may automatically tag an associated module driver software package in a database, and, subsequently, automatically source the tagged software for use in building a corresponding kernel design.

According to various embodiments, the design tool builds the configuration image of the SOC, including, for example, the placement region location and the shape of isolated logical components, cells, chip layout designs, etc., that have associated input/output (I/O) pins therein. It will be appreciated that logical components, intellectual property (IP) components, cells, chip layout designs, etc., referred to herein as components, may be reusable. Although particular components may be described in various contexts, it should be appreciated that a wide variety of components may be used.

According to various embodiments, the design tool provides a user interface that allows a user to select, from one or more databases of available PLD modules and OS packages, the PLD modules and OS packages which the user desires to be included in the SOC. For example, the design tool may include software that provides a graphical user interface, including, for example, dialog boxes and/or pull-down menus to facilitate selection from, for example a database or catalogue of available PLD modules and OS packages.

One or more of the databases may be accessible over the Internet, i.e., be "cloud-based". For example, user selection of a desired PLD module may be made from a database of PLD modules that is accessed via the Internet. Similarly, user selection of a desired OS package may be made from a database of OS packages that is accessed via the Internet. One or more of the OS packages may include embedded software such as, for example, BeRTOS, Linux, LynxOS, ThreadX, VxWorksto, or Windows CE.

A selected PLD module may have one or more corresponding PLD module drivers. In an implementation, the PLD module driver(s) corresponding to the user-selected PLD module may be automatically selected and obtained by the design tool for inclusion in the SOC. For example, the design tool may tag the corresponding PLD module driver(s) as being selected. Subsequently, as described in more detail hereinbelow, the tagged PLD module driver(s) may be obtained ("sourced") for inclusion in the SOC configuration image.

Figure 1:
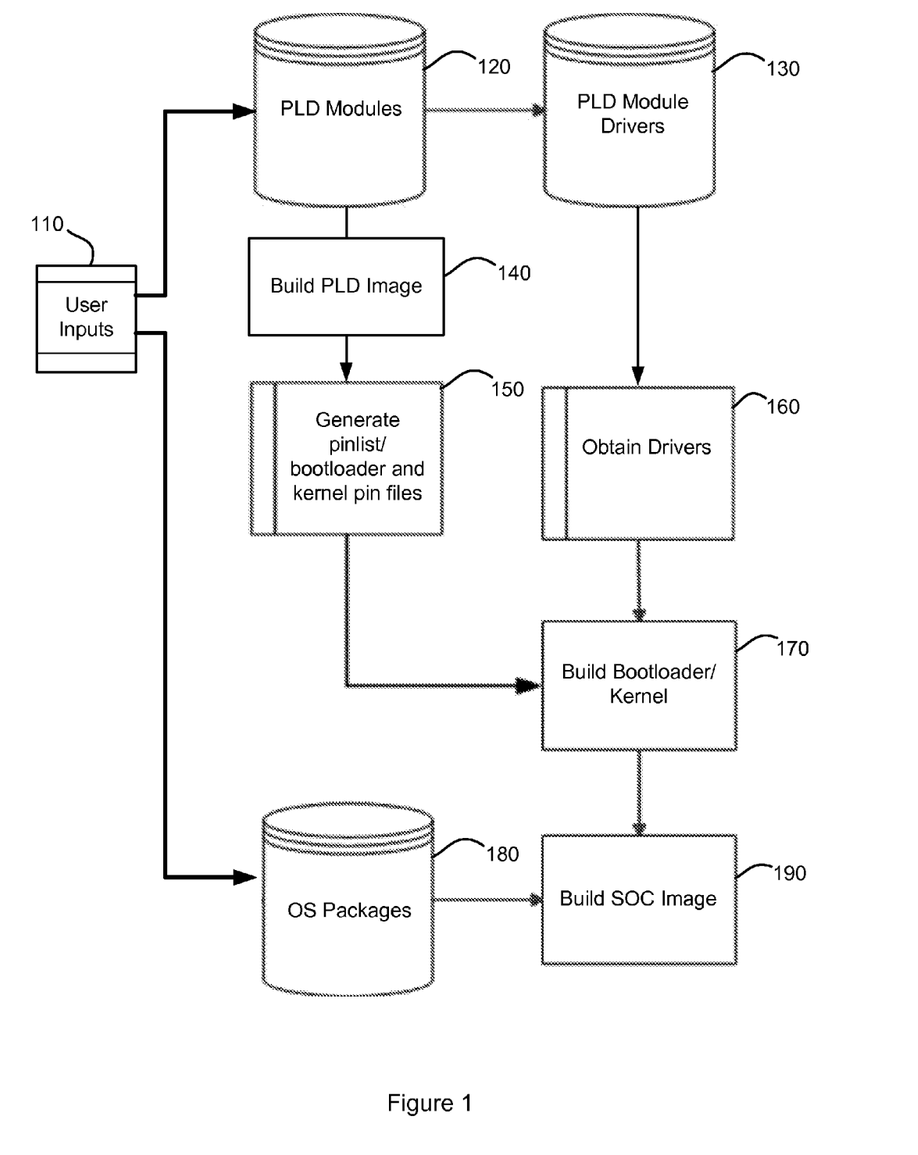
FIG. 1 is a logic block diagram illustrating an implementation of the presently disclosed techniques.

Referring now to FIG. 1, a logic block diagram of an implementation is illustrated. At block 110, user inputs with respect to selections of PLD modules and OS packages which the user desires to be included in the SOC may be entered into the design tool. For example, the user may interface with the design tool via a GUI. Moreover, the tool may facilitate access to one or more databases of PLD modules 120 and OS packages 180. The databases may be accessed over the Internet, a local area network, an intranet or may be stored locally with respect to the design tool. Examples of PLD modules include universal serial bus (USB) modules, and Universal Asynchronous Receiver/Transmitter (UART) modules and I²C modules. Examples of OS packages include Apache, file transfer protocol (FTP) packages, and Telnet.

For a given user selection of one or more PLD modules, the design tool may automatically identify and select corresponding PLD module drivers. The PLD module drivers may be accessible from one or more data bases 130. In some implementations, the design tool may find and select a corresponding PLD module driver from a database of PLD modules that is accessed via the Internet, a local area network, an intranet or stored locally with respect to the design tool. Advantageously, the design tool may tag a selected PLD module driver for subsequent sourcing.

At block 160, the design tool may obtain the selected PLD module drivers. For example, the design tool may source tagged module drivers from database 130. In some implementations, the PLD module drivers may be sourced from database 130 directly as opposed to retaining a local copy of the PLD module. Advantageously, block 160 may be executed automatically in preparation for execution of block 170.

At block 140, the design tool may compile a configuration image of the PLD, including complete binary representations of the user-selected PLD modules.

At block 150, the design tool may generate a pin list, bootloader and kernel pin files corresponding to the PLD configuration image built at block 140. In general, the pin list will depend on the built PLD configuration image. Correspondingly, the boot loader and kernel pin files will need to be modified based on the generated pin list. For example, where a new module is selected for the PLD, pin assignments will change on the silicon, which means that changes to both the bootloader and kernel pin files are needed. It will be appreciated that the bootloader may be configured to initialize an embedded system processor, whereas the kernel is a component of a software stack to be run on the SOC, which may be built independently of the selected OS packages.

At block 170, the design tool may compile a configuration image of the bootloader and the kernel corresponding to the pin lists and pin files generated at block 150, and the module drivers obtained at block 160. In some implementations, block 170 may be a user-initiated operation. The user my, for example, review the outputs of blocks 150 and 160 prior to initiating the operation of block 170. In other implementations the design tool may proceed to execute block 170 without further user input.

At block 190, the design tool may compile a configuration image of the SOC corresponding to the bootloader and kernel configuration image built at block 170 and the user selected OS packages obtained from OS packages database 180.

It will be appreciated that the design tool contemplated by the present disclosure provides an advantageously high level of automation to a SOC design process. In particular, the presently disclosed techniques contemplate the automatic sourcing, by the design tool, of appropriate PLD module drivers based upon a user selection of associated PLD modules. A user may interact with the design tool by way of a GUI, as indicated above. Alternatively, or in addition, the design tool may enable a user to interact with the design tool via command-line executables, scripts, and/or any combination thereof. In various embodiments, a script is provided to the design tool software. The script read in by the design tool software may be of various scripting languages such as Tool Command Language (TCL), Perl, Python and the like.

The presently disclosed techniques facilitate efficient design of complex SOC designs that may combine FPGA's with highly complex embedded processors, including, for example, ARM based processors ARM9 and Cortex, x86-based processors from Intel' and PowerPC from IBM, and associated operating system software, including, for example, Linux™, Windows, VxWorks, OSE and μC/OS-II.

Figure 2:
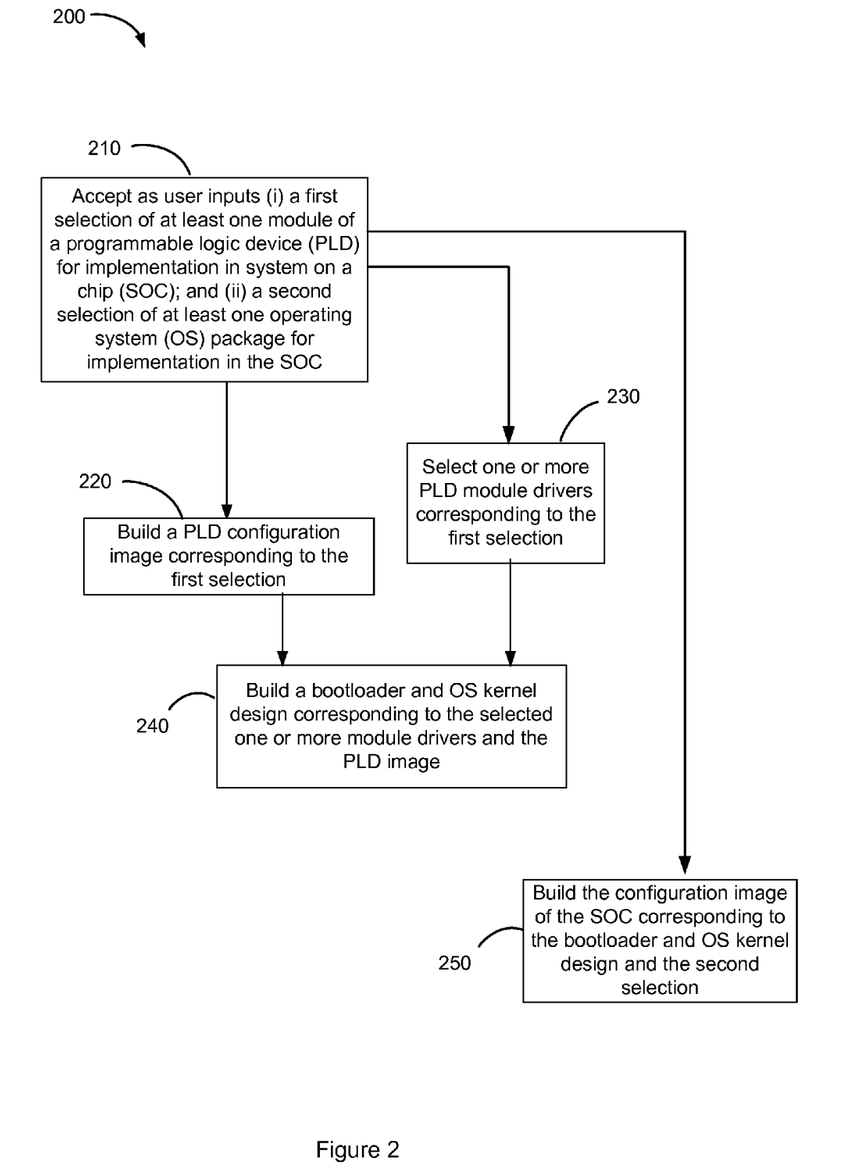
FIG. 2 is a process flow diagram illustrating a further implementation.

Referring now to FIG. 2, a process flow diagram illustrating an implementation of the present techniques is illustrated.

Method 200 may begin at block 201 by accepting as user inputs: (i) a first selection of at least one module of a PLD for implementation in the SOC; and (ii) a second selection of at least one OS package for implementation in the SOC. It will be appreciated that any number of PLD modules and software packages may be user-selected at block 201. In an implementation, block 201 and/or one or more of blocks 220, 230, 240, and 250 may be executed by a processor configured to run a design tool.

At block 220, a PLD configuration image corresponding to the first selection may be built. For example, a bitstream defining a desired PLD configuration may be prepared by the design tool for loading into the PLD.

At block 230, one or more PLD module drivers corresponding to the first selection may be selected. In some implementations, selected PLD modules may be automatically identified by the design tool in one or more databases, tagged for selection, and then sourced for use in subsequent process blocks of method 200. The databases may be accessed via the Internet, via a local area network or intranet, or stored locally with respect to the design tool.

At block 240, a bootloader and OS kernel design corresponding to the selected module driver(s) and the PLD image built at block 220, may be built. More particularly, once the PLD modules have been selected, the method may incorporate the appropriate driver to the bootloader and OS Kernel so that the module may be used directly by bootloader and OS without adding it separately. In some implementations, block 240 may be executed automatically by the design tool; in other implementations, an additional user command may be required to cause the design tool to executed block 240.

At block 250, the configuration image of the SOC corresponding to the bootloader and OS kernel design and the second selection may be built. As a result, a "final" configuration image of the SOC, including PLD configuration image and bootloader and OS kernel design information may be prepared.

Figure 3:
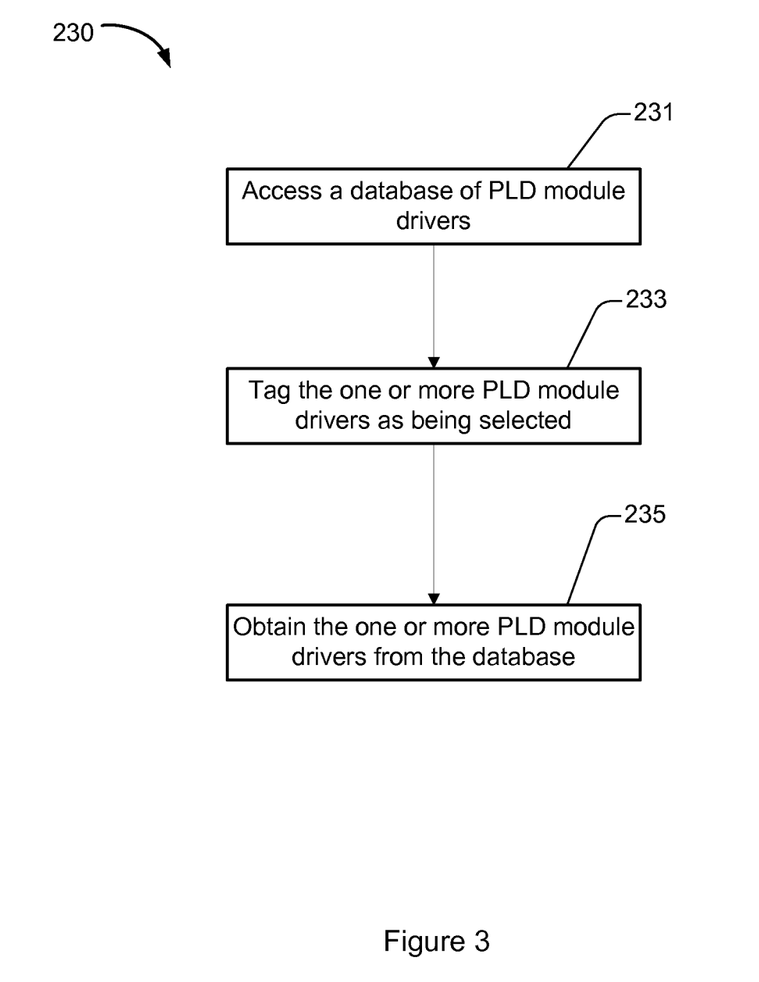
FIG. 3 is a detail of one example of an aspect of the process flow diagram of FIG. 2.

Referring now to FIG. 3, a detail of one implementation of process block 230 will be described. At block 231, a database of PLD module drivers may be accessed by the design tool. At block 233, one or more PLD module drivers may be tagged as being selected. At block 235, the one or more PLD module drivers may be obtained from the database.

Figure 4:
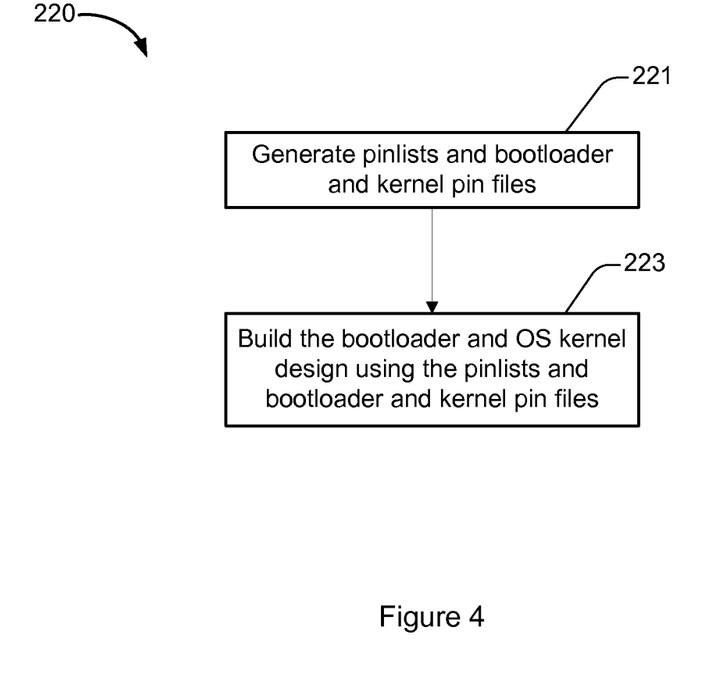
FIG. 4 is a detail of one example of another aspect of the process flow diagram of FIG. 2.

Referring now to FIG. 4, a detail of one implementation of process block 220 will be described. At block 221, pinlists and bootloader and kernel pin files may be generated. At block 223, the bootloader and OS kernel design may be built using the pinlists and bootloader and kernel pin files generated at block 221.

Figure 5:
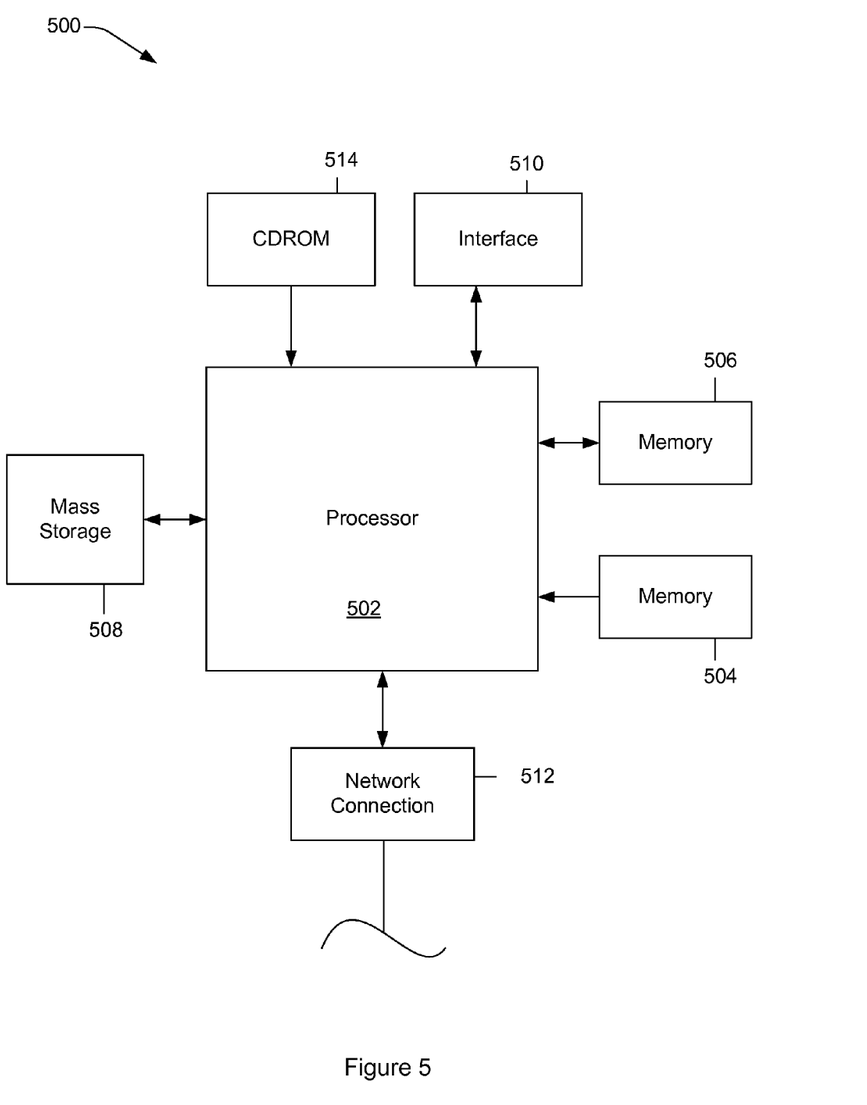
FIG. 5 is an example of a computer system configurable as a design tool is illustrated, in accordance with one implementation.

Referring now to FIG. 5, an example of a computer system configurable as a design tool is illustrated, in accordance with one implementation. The computer system 500 includes any number of processors 502 (also referred to as central processing units, or CPUs) that are coupled to devices including memory component 506 (typically a random access memory, or "RAM") and memory component 504 (typically a read only memory, or "ROM"). The processors 502 can be configured to build a configuration image of an SOC as described hereinabove.

Memory components 502 and 504 may include any suitable type of the computer-readable media described above. A mass storage device 508 may also be coupled to CPU 502 to provide additional data storage capacity and may include any of the computer-readable media described above. The mass storage device 508 may be used to hold a library or database of prepackaged logic or intellectual property functions, as well as information on generating particular configurations. It will be appreciated that the information retained within the mass storage device 508, may, in appropriate cases, be incorporated in standard fashion as part of memory component 506 as virtual memory. A specific mass storage device such as a CD-ROM 514 may also pass data uni-directionally to the CPU.

CPU 502 may be coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other input devices such as, of course, other computers. The CPU 502 may be a design tool processor. Finally, CPU 502 optionally may, advantageously, be coupled to a computer or telecommunications network using a network connection as shown generally at 512. With such a network connection, it is contemplated that CPU 502 might receive information from the network, or might output information to the network in the course of performing the above-described process steps. More particularly, CPU 502 may be enabled to access "cloud-based" remote data bases of, for example, PLD module designs and PLD module driver software. It should be noted that the system 500 might also be associated with devices for transferring completed designs onto a programmable chip.

Although many of the components and processes are described above in the singular for convenience, it will be appreciated by one of skill in the art that multiple components and repeated processes can also be used to practice the techniques of the present invention.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, a data processing apparatus.

If implemented in software, the functions may be stored as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may be non-transitory and may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Thus, improved automated techniques for designing an SOC, including producing a configuration image of the designed SOC, have been disclosed.

Although the foregoing systems and methods have been described in detail by way of illustration and example for purposes of clarity and understanding, it will be recognized that the above described systems and methods may be embodied in numerous other variations and embodiments without departing from the spirit or essential characteristics of the systems and methods. Certain changes and modifications may be practiced, and it is understood that the systems and methods are not to be limited by the foregoing details, but rather is to be defined by the scope of the appended claims.

What is claimed is:

1. A method, comprising:
    building, with a processor configured to run a design tool, a configuration image of a system on a chip (SOC), the processor accepting as user inputs (i) a first selection of at least one module of a programmable logic device (PLD) for implementation in the SOC; and (ii) a second selection of at least one operating system (OS) package for implementation in the SOC, wherein the design tool:
        compiles a PLD configuration image corresponding to the first selection;
        selects one or more PLD module drivers corresponding to the first selection;
        compiles a bootloader and OS kernel design corresponding to the selected one or more module drivers and the PLD image;
        builds the configuration image of the SOC corresponding to the bootloader and OS kernel design and the second selection; and
        builds the bootloader and OS kernel design by first generating one or more of (i) pinlists, (ii) bootloader pin files, and (iii) kernel pin files based on the PLD image, and then building the bootloader and OS kernel design using the one or more of (i) pinlists, (ii) bootloader pin files, and (iii) kernel pin files.

2. The method of claim 1, wherein the PLD is a field programmable gate array.

3. The method of claim 1, wherein the design tool is cloud-based.

4. The method of claim 1, wherein the design tool selects one or more PLD module drivers corresponding to the first selection by:
    accessing a database of PLD module drivers,
    tagging the one or more PLD module drivers as being selected, and
    obtaining the one or more PLD module drivers from the database.

5. The method of claim 4, wherein only a single database is used for the accessing and the obtaining.

6. The method of claim 1, wherein the design tool builds the bootloader and OS kernel design by first generating pinlists and bootloader and kernel pin files based on the PLD image, and then building the bootloader and OS kernel design using the pinlists and bootloader and kernel pin files.

7. An apparatus comprising:
    a processor configured to run a design tool; the processor configured to:
        build a configuration image of a system on a chip (SOC), the processor accepting as user inputs (i) a first selection of at least one module of a programmable logic device (PLD) for implementation in the SOC; and (ii) a second selection of at least one operating system (OS) package for implementation in the SOC, wherein the design tool:
            compiles a PLD configuration image corresponding to the first selection;
            selects one or more PLD module drivers corresponding to the first selection;
            compiles a bootloader and OS kernel design corresponding to the selected one or more module drivers and the PLD image;
            builds the configuration image of the SOC corresponding to the bootloader and OS kernel design and the second selection; and
            builds the bootloader and OS kernel design by first generating one or more of (i) pinlists, (ii) bootloader pin files, and (iii) kernel pin files based on the PLD image, and then building the bootloader and OS kernel design using the one or more of (i) pinlists, (ii) bootloader pin files, and (iii) kernel pin files.

8. The apparatus of claim 7, wherein the PLD is a field programmable gate array.

9. The apparatus of claim 7, wherein the design tool is cloud-based.

10. The apparatus of claim 7, wherein the design tool selects one or more PLD module drivers corresponding to the first selection by:
    accessing a database of PLD module drivers,
    tagging the one or more PLD module drivers as being selected, and
    obtaining the one or more PLD module drivers from the database.

11. The apparatus of claim 10, wherein only a single database is used for the accessing and the obtaining.

12. The apparatus of claim 7, wherein the design tool builds the bootloader and OS kernel design by first generating pinlists and bootloader and kernel pin files based on the PLD image, and then building the bootloader and OS kernel design using the pinlists and bootloader and kernel pin files.

13. A non-transitory computer-readable storage medium having stored thereon instructions which, when executed by a processor configured to run a design tool, cause the processor to perform operations, the operations comprising:
    building, with a processor configured to run a design tool, a configuration image of a system on a chip (SOC), the processor accepting as user inputs (i) a first selection of at least one module of a programmable logic device (PLD) for implementation in the SOC; and (ii) a second selection of at least one operating system (OS) package for implementation in the SOC, wherein the design tool:
        compiles a PLD configuration image corresponding to the first selection;
        selects one or more PLD module drivers corresponding to the first selection;
        compiles a bootloader and OS kernel design corresponding to the selected one or more module drivers and the PLD image;
        builds the configuration image of the SOC corresponding to the bootloader and OS kernel design and the second selection; and
        wherein the design tool builds the bootloader and OS kernel design by first generating one or more of (i) pinlists, (ii) bootloader pin files, and (iii) kernel pin files based on the PLD image, and then building the bootloader and OS kernel design using the one or more of (i) pinlists, (ii) bootloader pin files, and (iii) kernel pin files.

14. The non-transitory computer-readable storage medium of claim 13, wherein the PLD is a field programmable gate array.

15. The non-transitory computer-readable storage medium of claim 13, wherein the design tool is cloud-based.

16. The non-transitory computer-readable storage medium of claim 13, wherein the design tool selects one or more PLD module drivers corresponding to the first selection by:
   accessing a database of PLD module drivers,
   tagging the one or more PLD module drivers as being selected, and
   obtaining the one or more PLD module drivers from the database.

17. The non-transitory computer-readable storage medium of claim 16, wherein only a single database is used for the accessing and the obtaining.

18. The non-transitory computer-readable storage medium of claim 13, wherein the design tool builds the bootloader and OS kernel design by first generating pinlists and bootloader and kernel pin files based on the PLD image, and then building the bootloader and OS kernel design using the pinlists and bootloader and kernel pin files.

* * * * *